March 27, 1951  J. W. GOODERHAM  2,546,819
STEPPING FAILURE INDICATOR FOR SENSING DEVICES
Filed Oct. 21, 1948
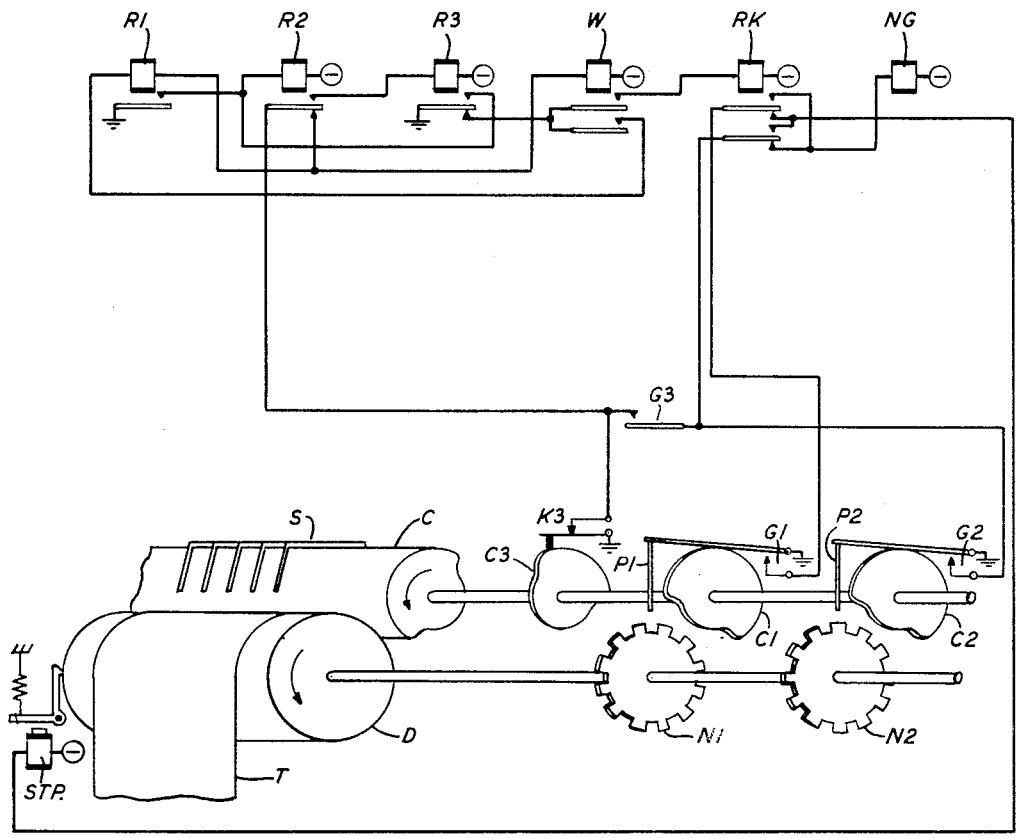
INVENTOR
J. W. GOODERHAM
BY
ATTORNEY Patented Mar. 27, 1951

2,546,819

UNITED STATES PATENT OFFICE 2,546,819

STEPPING FAILURE INDICATOR FOR SENSING DEVICES

John W. Gooderham, Rye, N. Y., assignor to Bell Telephone Laboratories, Incorporated, New York, N. Y., a corporation of New York Application October 21, 1948, Serial No. 55,793

12 Claims. (Cl. 177—311)

This invention relates to recording mechanisms and more particularly to the record-feeding means of recording, record-sensing, and similar devices.

In many recording and record-sensing devices, such as, for example, the recorder and record-senser disclosed in the copending application of W. W. Carpenter, Serial No. 588,401, filed April 14, 1945, records impressed in successive lines on a record medium are sensed successively by sensing fingers which are repeatedly raised and lowered to contact the record while the medium is advanced in a series of steps. Each time the sensing fingers are lowered, they should fall on a new line of the record. Should the record-feeding means fail, however, to advance the medium, the sensing fingers fall twice on the same line of the record and the interpretation of the record by the senser is thereby falsified. In practice, the successive lines of the record are read in rapid succession and a failure of the record-feeding means to advance the medium is not apparent. In such devices, therefore, it is important to provide some means for giving an immediate indication if the record-feeding means fails to step. However, any device which imposes a load on the record-feeding means increases the liability of failure of said means to step.

The present invention discloses a novel means for indicating failure of the record-feeding means to step, which also gives a positive indication of correct operation of said means and imposes no load thereon which would tend to interfere with the stepping movement of said means.

The features of the invention, its construction, and its operation will be apparent from the description which follows, the appended claims, and the drawing which shows one embodiment of the invention.

In the drawing, T is the recording medium upon which the record to be read is impressed, carried by the drum D and caused to adhere thereto by suitable means so that, when drum D is turned, said medium is advanced. The sensing fingers, represented at S, which sense the record are repeatedly raised and lowered by the continuously rotating cam C. Cam C3 controls contacts K3, said contacts being closed by said cam after the sensing fingers are raised and opened after the sensing fingers are lowered. Drum D is stepped by the stepping magnet STP so that the sensing fingers may fall successively on successive lines of the record. In the operation of the sensing device, each time the sensing fingers are raised, magnet STP is normally energized and released to advance the record T, the movement of drum D and said record occurring on the release of magnet STP. Reference may be had to the above-mentioned copending application for a more complete description of the construction and operation of a sensing device of this kind.

In accordance with the present embodiment of the invention, the notched discs N1 and N2 are rigidly mounted on the shaft of the drum D and turn with said drum. The cams C1 and C2 are rigidly mounted on the shaft of cam C and turn with the latter cam. Cams C1 and C2 control the feeler pins P1 and P2, respectively, which are lowered by said cams to contact discs N1 and N2, respectively, after the sensing fingers S are lowered and raised. Each of the discs N1 and N2 has one-half as many notches therein as there are sensing positions of the drum D and said discs are so oriented with respect to each other and to drum D that, in one sensing position of the drum D, one of the pins P1 and P2, when lowered, encounters a notch in its associated disc, closing its associated contacts G1 or G2, and the other of said pins does not encounter a notch and does not close its associated contacts. In the next sensing position of drum D, the second of said pins, when lowered, will then encounter a notch in its associated disc and will close its associated contacts, while the first of said pins will not encounter a notch and will not close its contacts.

The cams C1 and C2 and the discs N1 and N2 are shown only by way of illustration. It is obvious that other means may be used to raise and lower the pins P1 and P2. The notches in the discs N1 and N2 may be formed in the drum D instead of in separate discs, or may be replaced by holes in the drum D or other equivalent arrangements may be employed.

Assuming the sensing device to be operating, cams C, C3, C1 and C2 revolving continuously, when contacts K3 close, relay W operates over a circuit extending from battery through the winding of said relay, back contacts of relay R2, and contacts K3 to ground. Relay RK operates over a circuit extending from battery through the winding of said relay, upper contacts of relay W, and back contacts of relay R3 to ground. Upon further rotation of the cams, the sensing fingers fall, contacts K3 open, and pins P1 and P2 fall thereafter. Upon the opening of contacts K3, relay R1 operates in series with relay W through lower contacts of relay W and back contacts of relay R3 to ground. Relay R2 then operates over an obvious circuit.

Assuming that pin P2 encounters a notch in the disc N2, closing contacts G2, pin P1 does not encounter a notch in the disc N1 and contacts G1 are not closed. The stepping magnet STP is now energized by battery through the winding of said magnet, lower front contacts of relay RK and contacts G2 to ground. When the sensing fingers S are raised and cams C1 and C2 raise the pins P1 and P2, the circuit of the stepping magnet STP is opened by contacts G2 and said magnet released. This should step the drum D to present a new line of the record T for the next operation of the sensing fingers S. When contacts K3 now close, relay R3 operates over a circuit extending from battery through the winding of said relay, front contacts of relay R2, and contacts K3 to ground, opening the circuits of and releasing relays W, R1 and RK. Relay R2 is held operated, after the release of relay R1, through the front contacts of relay R3 to ground.

If the drum D does step from its previous position, pin P1, when again lowered, encounters a notch in the disc N1 and closes contacts G1, while pin P2 does not encounter a notch in the disc N2 and contacts G2 do not close. The circuit of stepping magnet STP is then complete from battery through the winding of said magnet, upper back contacts of relay RK, and contacts G1 to ground. If, on the other hand, drum D has not stepped from its previous position, discs N1 and N2 are in the same position as before and pin P2 is the one which encounters a notch in its associated disc and closes its contacts G2. The circuit of the stepping magnet STP is not then completed and the indicator, alarm, or other device NG, which may be of any suitable form, is actuated by ground through contacts G2 and lower back contacts of relay RK to said indicator, indicating failure of the drum D to step. The operation of the indicator or other device NG may be used to arrest by any suitable means further operation of the sensing mechanism to operate other devices, or merely as an alarm.

Assume, however, that drum D did step properly. When contacts K3 now open the circuit of relay R3 is thereby opened and said relay releases, releasing relay R2. The circuit is now in its original condition and the operations described above are repeated for succeeding lines of the record T.

If, however, when relays W and RK operate, as described above, and pins P1 and P2 next fall, drum D has not moved from its previous position, pin P1 again encounters a notch in the disc N1 and closes contacts G1, while pin P2 does not encounter a notch in the disc N2 and contacts G2 do not close. The circuit of the stepping magnet STP is not completed and the indicator or other device NG is actuated by ground through contacts G1 and upper front contacts of relay RK to said indicator, indicating failure of drum D to step.

Thus, each time the sensing fingers S of the sensing device are lowered to read a line of the record T, the position of the drum D is checked to ensure that a line of the record T is not read twice, due to failure of the drum D to advance the record T. If the drum D has stepped from its position at the previous operation of the sensing fingers, the sensing fingers will not again fall on the same line of the record T and the stepping magnet STP is operated, as described above, to permit the drum D to advance for the reading of the following line. But, if the drum D has not stepped from its previous position, the indicator NG is actuated, as described above, to indicate the failure, while the stepping magnet STP is not operated, so that the drum D remains stationary and thereby indicates the position of said drum at which the failure occurred.

It is suggested above that the operation of the indicator or other device NG be employed to arrest the movement of the sensing fingers S. However, if the cam C is allowed to continue to revolve after a failure of drum D to advance or if the sensing means, having been stopped after such a failure, is restarted, drum D may now advance, but at every alternate advance thereof the indicator NG will be actuated because the operations of the pins P1 and P2 are out of the normal sequence with respect to the operations of the relays of the circuit; that is, pin P1 encounters a notch in disc N1 and closes contacts G1 when relay RK is operated, while pin P2 encounters a notch in disc N2 and closes contacts G2 when relay RK is not operated. To correct this condition, it is necessary only to close contacts G3, by any suitable means, during one revolution of cam C. With contacts G3 closed with none of the relays of the circuit operated, when contacts G2 close relay W operates over a circuit extending from battery through the winding of said relay, back contacts of relay R2, contacts G3, and contacts G2 to ground, operating relay W which, in turn, completes the circuit of relay RK. The circuit of the stepping magnet STP is then completed through lower front contacts of relay RK and contacts G2 to ground, and normal operation of the circuit proceeds thereafter. On the other hand, if relays R1, R2, W and RK are operated, as described above, when contacts G3 are closed, then when contacts K3 close, the circuit of the stepping magnet STP is completed through lower front contacts of relay RK, contacts G3, and contacts K3 to ground. When contacts K3 then open, the stepping magnet STP is thereby released, advancing the drum D one step. This extra step of the drum D brings the operations of the pins P1 and P2 once more into normal sequence with respect to the operations of the relays of the circuit.

While I have illustrated my invention by a particular embodiment thereof, it is not limited in its application to said embodiment nor to the particular constructions and arrangements herein disclosed. It is obvious that the invention is applicable also to devices in which the part whose movement is checked moves continuously rather than in steps or in movements of translation rather than rotation. The pins P1 and P2 may be arranged to fall alternately on one disc N1 or N2 or upon a portion of the drum D having suitable notches or holes therein. Various other constructions, arrangements and modifications, which will be apparent to those skilled in the art, are within the scope of the invention. The terms and expressions which I have used in reference to this invention are used as terms of description and not of limitation and I have no intention in the use of such terms and expressions of excluding equivalents or modifications of the features shown and described or portions thereof but, on the contrary, intend to include therein any and all equivalents, modifications and adaptations which may be employed without departing from the spirit of the invention.

What is claimed is:

1. In combination, a movable member, cam-actuated feeler pins periodically contacting said member, cam-actuated contacts closed at the time when said feeler pins are out of engagement with said member, circuit means operably controlled by said cam-actuated contacts, and means controlled through said circuit means responsive to said feeler pins for producing a signal when said member does not move in the interval between two successive contacts of said feeler pins therewith.

2. In combination, a movable member, means for moving said member, cam-actuated feeler pins periodically contacting said member, cam-actuated contacts closed at the time when said feeler pins are out of engagement with said member, circuit means operably controlled by said cam-actuated contacts, and means controlled by said circuit means for rendering said member-moving means ineffective when said member fails to move in the interval between two successive contacts of said feeler pins therewith.

3. In combination, a movable member, means for moving said member, cam-actuated contacts operatively controlled by said member, circuit means responsive to the operation of said cam-actuated contacts, and cam-actuated feeler pins periodically contacting said member for rendering said member-moving means effective through said operated circuit means when said member moves in the interval between two successive contacts of said feeler pins therewith.

4. In combination, a movable member, means for moving said member, cam-actuated contacts operatively controlled by said member, circuit means responsive to the operation of said cam-actuated contacts, and cam-actuated feeler pins periodically contacting said member for rendering said member-moving means effective through said operated circuit means when said member moves in the interval between two successive contacts of said feeler pins therewith and ineffective when said member fails to move in said interval.

5. In combination, a member adapted to move in discrete steps, cam-actuated feeler pins contacting said member prior to each step thereof, cam-actuated contacts adapted to close and open once for each of said steps, circuit means responsive to the closure and opening of said cam-actuated contacts, and means controlled through said operated circuit means responsive to said feeler pins contacting said member for producing a signal if said member fails to step in the interval between two successive contacts of said feeler pins therewith.

6. In combination, a movable member, means for moving said member in discrete steps, cam-actuated contacts adapted to close and open once for each of said steps, circuit means responsive to the closure and opening of said cam-actuated contacts, and cam-actuated feeler pins contacting said member prior to each step thereof for rendering said member-moving means effective through said operated circuit means when said member moves in the interval between successive contacts of said feeler pins therewith and ineffective when said member fails to move in said interval.

7. In combination, a movable member having a plurality of positions of rest, feeler pins, means for moving said feeler pins into contact with said member at each position of rest thereof, means for controlling the movement of each of said pins in accordance with the position of said member when contacted by said pins, a pair of contacts, means for closing and opening said contacts once between each position of rest of said member, circuit means responsive to the operation of said pair of contacts, and means controlled by said operated circuit means responsive to said feeler pins contacting said member for producing a signal when said member fails to move in the interval between two successive contacts of said pins therewith.

8. In combination, a movable member having a plurality of positions of rest, means for moving said member successively to each of said positions, feeler pins, means for moving said feeler pins into contact with said member at each position of rest thereof, a pair of contacts, means for closing and opening said contacts once between each position of rest of said movable member, circuit means responsive to the operation of said pair of contacts, and means controlled by said operated circuit means responsive to said pins contacting said member for rendering said means for moving said member effective when said member moves in the interval between two successive contacts of said pins therewith and ineffective when said member fails so to move.

9. In combination, a normally moving member, two pairs of electrical contacts, means responsive to the normal movement of said member for closing said two pairs of contacts alternately, a third pair of electrical contacts, means responsive to the movement of said member for closing said third pair of electrical contacts before the closure of either of said two pairs of contacts and opening said third pair of contacts before the opening of either of said two pairs of contacts, circuit means responsive to the operation of said third pair of contacts, and means controlled by said operated circuit means responsive to two consecutive closures of one of said two pairs of contacts for producing a signal whereby no movement of said moving member is indicated.

10. In combination, a normally moving member, two pairs of electrical contacts, means responsive to the normal movement of said member for closing said two pairs of contacts alternately, a third pair of electrical contacts, means responsive to the movement of said member for closing said third pair of electrical contacts before the closure of either of said two pairs of contacts and opening said third pair of contacts before the opening of either of said two pairs of contacts, circuit means responsive to the operation of said third pair of contacts, and means controlled by said operated circuit means responsive to two consecutive closures of one of said two pairs of contacts for arresting the movement of said member.

11. In a record-sensing device, the combination with a record having sensible character indications in successive lines thereof, of a feeding means for said record, means for actuating said feeding means to advance said record one line at a time, means for contacting said record at each line thereof, a first contact means for engaging said record-feeding means coincidentally with said record-contacting means contacting said record, a second contact means for engaging said record-feeding means at a time when said record-contact means are out of contact with said record, and means responsive to said second contact means engaging said record-feeding means for rendering said actuating means ineffective unless said record-feeding means is advanced between two successive engagements of said record by said record-contacting means.

12. In a record-sensing device, the combination with a record having sensible character indications in successive lines thereof, of a record-feed drum carrying said record, means for rotating said drum to feed said record one line at a time, cam-actuated feeler pins periodically contacting said drum, cam-actuated contacts closed in advance of the contacting of said drum by said cam-actuated feeler pins, circuit means responsive to said cam-actuated contacts, and means controlled through said operated circuit means responsive to said feeler pins contacting said drum for rendering said rotating means effective when said drum rotates between successive contacts of said feeler pins therewith and ineffective when said drum fails to so rotate.

JOHN W. GOODERHAM.

REFERENCES CITED

The following references are of record in the file of this patent:

UNITED STATES PATENTS

| Number | Name | Date |
| --- | --- | --- |
| 1,945,666 | Stewart | Feb. 5, 1934 |
| 2,142,880 | Anderson et al. | Jan. 3, 1939 |
| 2,410,521 | Potts | Nov. 5, 1946 |
| 2,462,655 | McHenry | Feb. 22, 1949 |

FOREIGN PATENTS

| Number | Country | Date |
| --- | --- | --- |
| 608,627 | France | Apr. 24, 1926 |